(12) United States Patent
Singer-Schnoeller et al.

(10) Patent No.: US 12,397,354 B2
(45) Date of Patent: Aug. 26, 2025

(54) TOOL SYSTEM

(71) Applicant: CERATIZIT AUSTRIA GESELLSCHAFT M.B.H., Reutte (AT)

(72) Inventors: Alexander Singer-Schnoeller, Reutte (AT); Harald Urschitz, Reutte (AT); Johannes Trost, Reutte (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 593 days.

(21) Appl. No.: 17/786,700

(22) PCT Filed: Nov. 10, 2020

(86) PCT No.: PCT/EP2020/081586
§ 371 (c)(1),
(2) Date: Jun. 17, 2022

(87) PCT Pub. No.: WO2021/121783
PCT Pub. Date: Jun. 24, 2021

(65) Prior Publication Data
US 2023/0015428 A1    Jan. 19, 2023

(30) Foreign Application Priority Data

Dec. 17, 2019    (EP) .................................. 19216972

(51) Int. Cl.
*B23B 1/00*    (2006.01)
*B23B 27/16*    (2006.01)
(Continued)

(52) U.S. Cl.
CPC ............ *B23B 1/00* (2013.01); *B23B 27/1611* (2013.01); *B23B 27/1681* (2013.01);
(Continued)

(58) Field of Classification Search
CPC ... B23B 1/00; B23B 27/1618; B23B 27/1655; B23B 27/1696; B23B 27/1611;
(Continued)

(56) References Cited

U.S. PATENT DOCUMENTS

| 4,785,513 A | 11/1988 | Lee et al. |
| 5,607,263 A * | 3/1997 | Nespeta .................. B23B 31/11 407/53 |

(Continued)

FOREIGN PATENT DOCUMENTS

| AT | 505069 A1 | 10/2008 |
| DE | 19940330 A1 | 3/2001 |

(Continued)

OTHER PUBLICATIONS

Computer generated translation of WO-2011029944-A1 (Year: 2011).*

*Primary Examiner* — Sara Addisu
(74) *Attorney, Agent, or Firm* — Laurence A. Greenberg; Werner H. Stemer; Ralph E. Locher

(57) ABSTRACT

A tool system includes a machine-proximal shank configured to be introduced into a driven tool receptacle and containing a device for transferring a rotating movement to be picked up from the driven tool receptacle. A tool-proximal shank is configured as a tool holder or to have a tool holder releasably connected thereto. A gear mechanism disposed between the machine-proximal shank and the tool-proximal shank is configured to transfer a rotating movement transmitted by the device in a reduced manner to the tool-proximal shank. At least one insert seat configured on the tool holder for receiving an interchangeable cutting insert is provided on an end face of the tool holder extending transversely to a longitudinal axis of the tool holder. A method for machining a workpiece is also provided.

14 Claims, 8 Drawing Sheets

(51) Int. Cl.
*B23B 29/20* (2006.01)
*B23Q 5/04* (2006.01)

(52) U.S. Cl.
CPC ............ *B23B 29/205* (2013.01); *B23Q 5/048* (2013.01); *B23B 2200/0423* (2013.01); *B23B 2205/18* (2013.01); *B23B 2260/076* (2013.01)

(58) Field of Classification Search
CPC ............ B23B 29/205; B23B 2260/076; B23B 2200/0423; B23B 2205/18; B23Q 5/048
See application file for complete search history.

(56) References Cited

U.S. PATENT DOCUMENTS

| | | | | |
|---|---|---|---|---|
| 6,715,386 B2* | 4/2004 | Maier | ............... | B23B 29/24 82/159 |
| 7,219,584 B2* | 5/2007 | Edler | ............... | B23B 29/242 82/159 |
| 7,416,372 B2* | 8/2008 | Hyatt | ............... | B23B 1/00 407/65 |
| 9,352,402 B2* | 5/2016 | Luik | ............... | B23C 5/2295 |
| 10,717,187 B2* | 7/2020 | Iqtidar | ............... | B25J 9/042 |
| 11,396,051 B2* | 7/2022 | Maier | ............... | B23B 27/1611 |
| 11,597,017 B2* | 3/2023 | Stjernstedt | ............... | B23B 27/1611 |
| 11,806,791 B2* | 11/2023 | Maier | ............... | B23B 29/04 |
| 12,172,218 B2* | 12/2024 | Stjernstedt | ............... | B23B 27/16 |
| 2006/0110227 A1* | 5/2006 | Kruszynski | ............... | B23B 51/00 408/230 |
| 2011/0182680 A1* | 7/2011 | Cohen | ............... | B23C 5/10 82/1.11 |
| 2012/0201616 A1* | 8/2012 | Hecht | ............... | B23B 29/043 407/120 |
| 2020/0324345 A1 | 10/2020 | Maier et al. | | |
| 2021/0008635 A1* | 1/2021 | Stjernstedt | ............... | B23B 1/00 |
| 2021/0086270 A1* | 3/2021 | Shimamoto | ............... | B23B 29/043 |

FOREIGN PATENT DOCUMENTS

| | | | | |
|---|---|---|---|---|
| DE | 19958461 C1 | 3/2001 | | |
| DE | 10306845 A1 | 9/2004 | | |
| DE | 102008036562 A1 * | 2/2010 | ............... | B23C 3/28 |
| EP | 1260294 A1 | 11/2002 | | |
| EP | 3246125 A1 | 11/2017 | | |
| EP | 3501701 A1 | 6/2019 | | |
| JP | S60167602 U | 11/1985 | | |
| JP | 2001508366 A | 6/2001 | | |
| JP | 2003039229 A | 2/2003 | | |
| WO | WO-2004022270 A1 * | 3/2004 | ............... | B23B 1/00 |
| WO | 2008124856 A1 | 10/2008 | | |
| WO | WO-2011029944 A1 * | 3/2011 | ............... | B23B 1/00 |

* cited by examiner

TOOL SYSTEM

FIELD AND BACKGROUND OF THE INVENTION

The present invention relates to a tool system for machining, in particular for turning, and a method for machining a workpiece.

Complete machining of a workpiece often requires several machining operations, which differ at least in terms of an angle of attack and/or indexable inserts.

In addition, further processing steps are often required outside of a turning center of the workpiece, such as face milling, longitudinal and cross drilling, etc.

Several tool changes may therefore be necessary for the complete machining of a workpiece. The tools are typically disposed on a tool carrier having a plurality of tool locations. An example of such a tool carrier is a tool turret (also referred to as a turret tool carrier). By turning the turret disk, the tool that is currently required can be pivoted to a use position.

Typically, different tools are required for the various processing steps. Tool changes lead to longer tooling times.

SUMMARY OF THE INVENTION

It is an object of the present invention to overcome the disadvantages of the prior art discussed above.

The object is achieved by a tool system having the features described below and a method having the features described below.

Preferred refinements are set forth in the dependent claims.

A tool system according to the invention comprises:
- a machine-proximal shank, which is configured to be insertable into a driven tool receptacle, the machine-proximal shank containing a means for transmitting a rotating movement that can be acquired from the driven tool receptacle;
- a tool-proximal shank, which is configured as a tool holder or to which a tool holder is releasably connected;
- a gear mechanism disposed between the machine-proximal shank and the tool-proximal shank, said gear mechanism being configured to transmit by way of a reduction to the tool-proximal shank a rotating movement transmitted by the means;
- at least one insert seat configured on the tool holder for receiving an interchangeable cutting insert, said insert seat being configured on an end face of the tool holder that extends transversely to a longitudinal axis of the tool holder.

Created as a result of the tool system according to the invention is the possibility of transmitting a rotating movement of a driven tool receptacle to the tool-proximal shank by way of a reduction, so as to in this way rotationally adjust the insert seat configured on the tool holder for receiving an interchangeable cutting insert.

In other words, it is made possible to use the rotating movement of a driven tool receptacle, which is actually provided for driving a driven tool, for the purpose of a fine adjustment of a tool.

For the sake of clarity, it should be noted that the gear reduction occurs in such a way that a machine rotating speed or an angular movement on the drive is transmitted in a reduced manner to the tool-proximal shank.

The gear reduction achieves a high level of positioning accuracy, because a rotating movement of a drive of the driven tool receptacle by a specific angle is reduced by the gear reduction factor and transferred to the tool-proximal shank.

Self-locking of the transmission is provided or at least facilitated by the gear reduction.

A reverse torque flow, i.e. from the tool in the direction of the drive, is thus suppressed. In this way, forces impinged on the tool-proximal shank, for example cutting forces, do not lead to undesirable twisting.

Also, as a result of the gear reduction, any play between the tool holder and the machine-proximal drive is propagated to the tool-proximal shank only by the reduction factor.

It is preferably provided that a rotating movement transmitted from the machine-proximal shank to the tool-proximal shank is transmitted at a reduction between 50:1 and 1000:1, preferably between 75:1 and 125:1, more preferably approximately 100:1. "Approximately 100:1" in the particularly preferred embodiment also comprises deviations of +/−10%, i.e. 90:1 to 110:1.

A particularly high level of positioning accuracy is achieved as a result of the preferably high level of gear reduction.

A reduction of preferably approximately 100:1 also offers a good compromise between positioning accuracy and adjustment speed.

Drives for driven tool receptacles typically have speeds of 4000 to 5000 rpm. At a gear reduction of 100:1, this means speeds of 40-50 rpm on the tool-proximal shank.

In an alternative preferred embodiment, the gear mechanism has a reduction of 120:1. As a result of this reduction factor, by which 360° can be divided as an integer, a desired integer variation in the angle of the tool can be programmed particularly easily: in the example mentioned of a preferred reduction factor of 120:1, one revolution of the machine (i.e. an angle of 360°) causes a variation in the angle of the tool of 3° (360°/120).

Self-locking is typically ensured by the preferably high degree of gear reduction.

It is also advantageous that an increased torque is available on the tool-proximal shank due to the reduction of the rotating movement transmitted by the machine-proximal shank.

The tool system according to the invention makes it possible, for example, to move a tool disposed on the tool-proximal shank, such as a cutting insert, to a different position, that is to say to adjust said tool. A different position can mean, among other things, an alignment of a cutting edge of a cutting insert. As a result, the same tool can be used for another machining step, the latter machining step differing from the previously selected tool setting in terms of the required alignment of the cutting edge in comparison to the previously chosen setting of the tool A change from longitudinal turning to face turning is to be mentioned as an example.

A different position can also mean that a different cutting edge of the cutting insert is provided. This is particularly relevant in the case of cutting inserts which have a plurality of cutting edges, some of which are configured differently.

Thus, with the tool system according to the invention, only a single place on a tool carrier is required for example for two or even more machining steps, for which two or even more different tools and thus places on the tool carrier would be required without the tool system according to the invention.

The tool system according to the invention allows a tool to be used particularly economically, since the same tool can be used for different processing steps if necessary.

In particular, the transmission is configured without play, or play compensation can be provided.

It is particularly advantageous for the transmission to be configured to be self-locking. This means that a moment applied on the tool does not lead to twisting. This is particularly advantageous in order not to lose the original position when changing the turret location, but to retain the original position of the latter for subsequent use.

In this context, it is particularly favorable for the transmission of a rotating movement to be configured so as to be able to be coupled to machine. When a tool station is changed, the original position can be re-acquired after a tool station has been changed.

The gear mechanism can preferably be a strain wave gear (also referred to as harmonic gearing or sliding wedge gear, also known as harmonic drive gearing). This gear type is characterized by particular positioning accuracy and little play.

It is preferably provided that the machine-proximal shank is configured as a DIN 69880/DIN ISO 10889 compatible tool receptacle—a so-called VDI holder.

VDI tool holders are specified according to the diameter of the tool receptacle, for example "VDI 40" refers to a cylinder diameter of the tool receptacle of 40 mm.

The means for transmitting a rotating movement can consist of a shaft, for example. The means for transmitting a rotating movement comprises an interface for coupling to a drive, the latter being configured to acquire a rotating movement of a driven tool receptacle. In a simple case, the interface consists of a toothing, for example a polygonal toothing, which can be introduced into a corresponding mating toothing of a tool carrier. Furthermore, the interface can be configured so as to be couplable.

It can be provided that a longitudinal axis of the machine-proximal shank runs substantially parallel to a longitudinal axis of the tool-proximal shank and/or of the tool holder.

In one variant, the longitudinal axis of the machine-proximal shank runs substantially coaxially with the longitudinal axis of the tool-proximal shank.

According to an alternative arrangement, there is a lateral offset between the longitudinal axis of the machine-proximal shank and the longitudinal axis of the tool-proximal shank. This cranked arrangement is particularly advantageous for use of the tool system on a so-called star turret, i.e. a tool carrier having a circumferential (radial) arrangement of tool receptacles.

According to one variant, the longitudinal axis of the tool holder runs parallel to and so as to be laterally offset from the longitudinal axis of the shank on the tool side. In other words, it can be provided that the tool holder is configured so as not to be coaxial with the tool-proximal shank. This arrangement causes the tool holder in the rotating movement of the tool-proximal shank to perform a pivoting movement along a circular path about the longitudinal axis of the tool-proximal shank.

It can be provided that the longitudinal axis of the tool-proximal shank and/or of the tool holder runs so as to be inclined in relation to the longitudinal axis of the machine-proximal shank. In this way, there is an angular offset between the drive input and the drive output. The angle can preferably be a right angle.

An angled arrangement is particularly advantageous for use of the tool system on a so-called disk turret, i.e. a tool carrier with an end-side (axial) arrangement of the tool receptacles.

An insert seat for receiving an interchangeable cutting insert is provided on the tool holder. The insert seat is oriented transversely to the tool holder, i.e. transversely to the longitudinal axis of the tool holder.

The insert seat is preferably oriented so as to be substantially perpendicular to the longitudinal axis of the tool holder. In other words, this means that the plane normal of the insert seat runs so as to be substantially parallel to the longitudinal axis of the tool holder.

An insert seat is typically not configured as a flat face. Rather, an insert seat usually has a surface design that corresponds to a lower side of a cutting insert to be received in the insert seat, as a result of which the cutting insert is also fixed in a form-fitting manner in the insert seat. This surface design can be configured, for instance, in the form of positioning elements, which can specify an installation of a cutting insert on the insert seat in a positionally correct manner.

As a result, there is of course a large number of plane normals pointing in different directions on the surface of an insert seat.

For the sake of simplicity, the reference plane used here to describe the orientation of the insert seat is understood to be that plane normal to which the predominant action of a clamping force occurs. The clamping force is usually generated via a clamping screw or a clamping claw, through which clamping force a cutting insert is drawn into the insert seat.

An orientation of the insert seat "transverse to the tool holder" means that the reference plane of the insert seat runs so as to be inclined to the longitudinal axis of the tool holder. In particular, the insert seat is aligned so as to be substantially perpendicular to the longitudinal axis of the tool holder. "Substantially" also comprises deviations of several degrees, for example 10°. However, it is particularly favorable for the insert seat to be aligned perpendicularly to the longitudinal axis of the tool holder.

In contrast to conventional arrangements for turning, the tool system according to the invention is set up such that when the tool system is used, a predominant introduction of cutting forces takes place in the direction of the longitudinal axis of the tool holder. As a result, only small bending moments act on the tool holder. This arrangement is particularly stiff.

In particular, exactly one insert seat is configured on the tool holder.

The insert seat is preferably configured to receive a cutting insert for turning.

In a further refinement, an interchangeable cutting insert comprising at least one cutting corner having an upper side configured as a rake face and a lower side configured as a bearing face is disposed on the at least one insert seat in such a manner that the upper side of the cutting insert extends so as to be substantially perpendicular to the longitudinal axis of the tool holder. "Substantially" also comprises deviations of several degrees, for example 10°. However, it is particularly favorable for the upper side of the cutting insert to be aligned perpendicularly to the longitudinal axis of the tool holder.

More preferably, the cutting insert is configured as a polygonal cutting insert. In this case, the cutting insert has cutting edges delimited by cutting corners.

The cutting insert is particularly preferably configured as a substantially triangular insert having three cutting corners that can be used for machining.

The cutting insert is disposed such that at least one cutting corner and cutting edge portions adjoining the latter on both sides protrude beyond an external circumference of the end face of the tool holder.

Furthermore preferably, the entire external circumference of the cutting insert projects beyond the external circumference of the tool holder. In principle, the cutting insert can thus be used along the entire circumference thereof.

The cutting insert can, for example, have a plurality of cutting edges of identical configuration, or else differently configured cutting edges can be provided. A cutting insert with a basic shape of an equilateral triangle is advantageous with a view to particularly simple indexing of the cutting insert in this case, i.e. an onward rotation of the cutting insert to a next cutting corner, said onward rotation potentially being performed using the tool system according to the invention. It is therefore not necessary to release the cutting insert from the insert seat.

An arrangement according to which the longitudinal axis of the tool-proximal shank runs through a cutting corner radius center of a cutting corner of the cutting insert is preferable. A curvature of a cutting corner can be described by a circle. The center of this circle is referred to in this context as the cutting corner radius center.

If the tool system is configured in such a way that the longitudinal axis of the tool-proximal shank, and thus the rotation axis of the tool-proximal shank, runs through the cutting corner radius center, a contour of the relevant cutting corner is invariant with regard to the rotation when the alignment of the cutting insert changes.

In other words: if the relevant cutting corner, the rotation axis of the tool-proximal shank running through cutting corner radius center of said relevant cutting corner, is in engagement with a workpiece, a radial spacing of the cutting corner from the workpiece remains unchanged when the cutting insert rotates about said axis of rotation.

This has the particular effect and advantage that no translatory compensation of the position of the relevant cutting corner in relation to a workpiece to be machined has to be carried out, for example in order for a cutting depth to be kept constant. This facilitates machine programming.

The tool system allows, for example, a change in an angle of attack of a cutting edge, in that the rotating movement that can be acquired by the driven tool receptacle is transmitted to the tool-proximal shank by way of a gear reduction.

In this way, the same cutting insert can be used for different machining operations that require different angle of attacks.

More preferably, the cutting insert has at least two mutually dissimilar cutting edges. In this refinement of the tool system, another cutting edge can be moved to a machining position for a next machining step by transmitting the from the driven tool receptacle to the tool holder.

The tool system makes it possible to adjust the cutting insert in such a way that other cutting edges are brought into position for different machining operations by transferring the rotating movement that can be picked up from the driven tool receptacle to the tool-proximal shank in a reduced manner.

The tool system is particularly suitable for machining by turning.

Protection is also sought for a method for machining a workpiece using a tool system comprising a machine-proximal shank which is configured to be insertable into a driven tool receptacle, the machine-proximal shank containing a means for transmitting a rotating movement which can be acquired from the driven tool receptacle;

a tool-proximal shank which is configured as a tool holder or to which a tool holder is releasably connected;

a gear mechanism disposed between the machine-proximal shank and the tool-proximal shank, said gear mechanism being configured to transmit by way of a reduction to the tool-proximal shank a rotating movement transmitted by the means;

at least one insert seat configured on the tool holder with an interchangeable cutting insert accommodated therein, which insert seat is configured on an end face of the tool holder extending transversely to a longitudinal axis of the tool holder, wherein the method comprises the following steps:

rotating the workpiece about a workpiece axis;

machining a surface of the workpiece using the cutting insert in such a manner that the upper side of the cutting insert, configured as a rake face, is substantially perpendicular to the longitudinal axis of the tool holder, changing an alignment of the cutting insert in that a rotating movement from the means for transmitting the rotating movement is transmitted to the tool holder carrying the cutting insert by way of a reduction by the gear mechanism.

The method for machining a workpiece is, in particular, machining by turning.

According to the method according to the invention, an alignment of a cutting insert is changed by means of a rotating movement that can be acquired from a driven tool receptacle.

The actual machining takes place by way of a relative movement of the rotating workpiece in relation to the cutting insert.

The rotating movement that can be acquired from the driven tool receptacle is not used for an actual cutting performance, as is known, for example, with tools driven by a driven tool receptacle, such as drills or milling cutters.

According to the invention, in contrast, the rotating movement that can be acquired from the driven tool receptacle is used to change the alignment of the cutting insert.

To this end, a drive of the driven tool receptacle is activated until the desired change in the alignment of the cutting insert has taken place.

Alternatively or additionally, in a couplable embodiment of the means for transmitting the rotating movement, the duration of the transmission of the rotating movement can be determined by coupling and uncoupling the means for transmitting the rotating movement.

By changing the alignment of the cutting insert, a formation of chips on the cutting insert is changed.

An alignment of a cutting insert includes the position of the cutting insert in terms of the angle of attack of a cutting edge in relation to the workpiece surface to be machined.

An alignment of a cutting insert can also or additionally be characterized by a selection of a cutting edge, said cutting edge being intended for a specific machining step.

In particular, it can be provided that the changing of the alignment of the cutting insert takes place while the cutting insert is disengaged from the workpiece. According to this variant of the method, the tool is thus moved to a position in which the cutting insert is not engaged with the workpiece ("in the cut mode"), and changing of an alignment of the cutting insert takes place in this position. After the alignment of the cutting insert has been changed, the tool can be moved back to an operating position. The change in the alignment of the cutting insert can be an adjustment of an angle of attack of the cutting edge that is provided for the subsequent machining step. Alternatively, changing the orientation of the cutting insert may be moving a different cutting edge into position for the subsequent machining step.

Alternatively, the adjustment can also be made while cutting, i.e. in the operating position.

According to this variant, it is provided in particular that the angle of attack of a cutting edge is changed while the latter is engaged.

In the context of this disclosure, operating position means that the cutting insert is in engagement with the workpiece to be machined. Outside an operating position means that the cutting insert is disengaged ("from the cutting mode").

The angular changes to be carried out on the tool holder in order to change the alignment of the cutting insert are typically minor in terms of absolute values. If the change in the alignment of the cutting insert lies in changing the angle of attack of the cutting edge provided for the subsequent machining step, the angular values are typically in the range of a few angular degrees, particularly when the angle of attack changes in the cutting mode.

If the orientation of the insert is changed by positioning another cutting edge for the subsequent machining step then, using the example of a triangular insert, the latter is typically rotated by 120° in order to switch to an adjacent cutting edge.

According to a refinement of the method, it can be provided that a coordinated translatory movement of the tool takes place conjointly with the change in the angle of attack.

This means that, in addition to changing the angle of attack by rotation of the cutting insert, a translatory movement coordinated with this rotation takes place in a plane parallel to a tool plane in such a manner that a position of the engaged cutting corner relative to the workpiece is maintained. Maintaining the position can mean, for example, that a cutting depth is kept constant when the angle of attack changes.

Furthermore, the translatory movement coordinated with the change in the angle of attack can be coordinated in such a way that a feed at the engaged cutting corner is kept constant. In this case, an already provided feed rate of the tool parallel to the longitudinal axis of the workpiece is taken into account in the coordinated translatory movement, such that a feed rate with respect to the workpiece surface remains constant.

This is particularly relevant for maintaining a uniform workpiece surface: since a cutting corner draws a spiral path on the surface of the workpiece during turning, a translatory movement of the cutting insert superimposed by the feed rate would, without such compensation, lead to a changed surface profile due to a changed spacing between turning marks.

In the configuration of the tool system discussed further above, in which the longitudinal axis of the tool-proximal shank runs through a cutting corner radius center of an active cutting corner of the cutting insert, a translatory movement coordinated with the change in the angle of attack to compensate for the position of the cutting corner in relation to the workpiece is advantageously not required.

Furthermore, protection is sought for using a tool system, according to the invention, so as to change an alignment of a cutting edge of a cutting insert when machining a workpiece.

Further advantages and expedient features of the invention are derived from the following description of exemplary embodiments with reference to the attached figures.

DETAILED DESCRIPTION OF THE INVENTION

The tool system 1 is described and the method for machining a workpiece W is discussed with reference to the figures. For the sake of clarity, reference signs for identical elements are sometimes not repeated in the figures.

Figure 1:
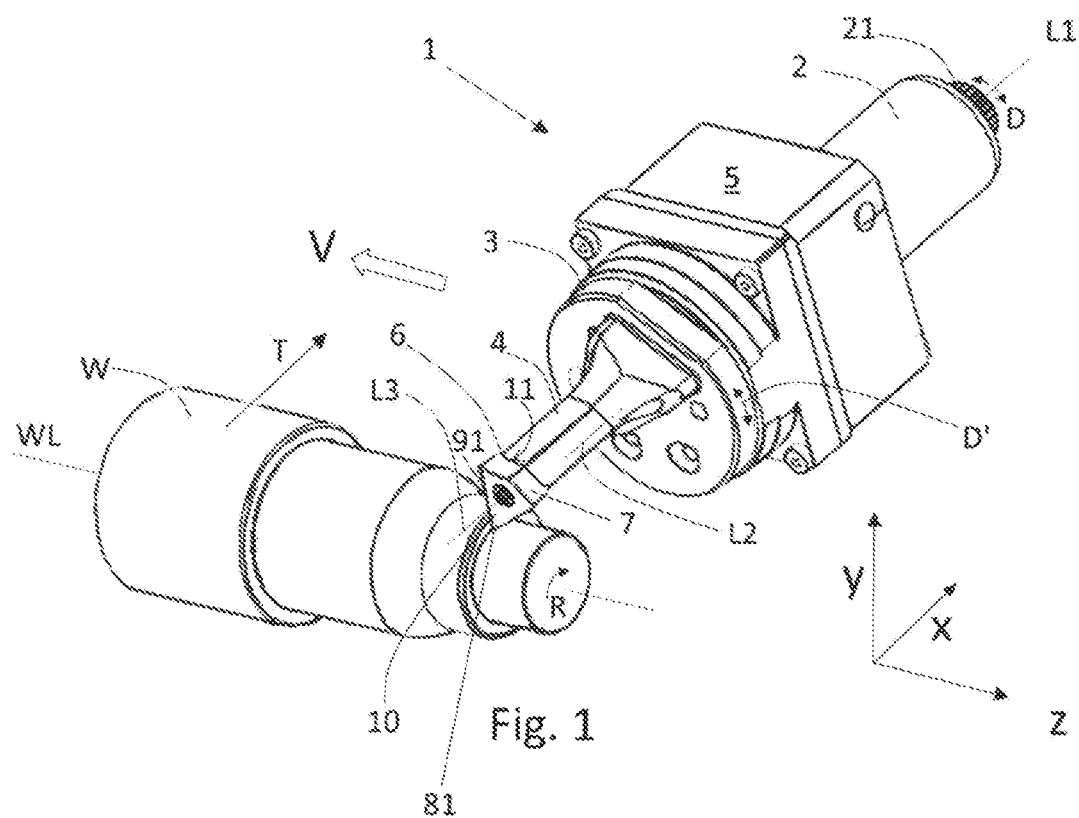
FIG. 1 shows an embodiment of a tool system according to the invention in a perspective view.

FIG. 1 shows an embodiment of a tool system 1 according to the invention in a perspective view.

The tool system 1 illustrated comprises a machine-proximal shank 2 which has a longitudinal axis L1 and is configured so that said machine-proximal shank 2 is able to be introduced into a driven tool carrier (not illustrated). The tool carrier can be configured as a tool turret, for example. The machine-proximal shank 2 forms an interface to the tool carrier. In particular, the machine-proximal shank 2 can be configured as a VDI cylinder shank according to DIN 69880.

The machine-proximal shank 2 contains means 21 for transmitting a rotating movement D, said rotating movement D being able to be acquired from the driven tool carrier. The means 21 for transmitting a rotating movement D can, for example, and as shown in this exemplary embodiment, be composed of a shank which at the machine-proximal end thereof has an interface for coupling to a drive of the driven tool carrier.

The interface typically comprises a toothing, in the present example a polygonal toothing, which can be introduced into a corresponding mating toothing on the tool carrier. In an assembly situation on a tool carrier, the machine-proximal shank 2 is connected to the tool carrier in a rotationally fixed manner. The rotating movement D of a driven tool carrier is transmitted by way of the means 21 for transmitting a rotating movement.

The tool system 1 furthermore comprises a tool-proximal shank 3 which is rotatably connected to the gear mechanism 5. The gear mechanism 5 is configured such that it transmits by way of a reduction to the tool-proximal shank 3 a rotating movement D transmitted by the means 21, said rotating movement being able to be acquired from the tool carrier.

The transmission 5 is conceived to transmit the rotating movement D transmitted by the machine-proximal shank 2, more specifically via the means 21, preferably with a reduction of between 50:1 and 1000:1, more preferably between 75:1 and 125:1, particularly preferably about 100:1 to the tool-proximal shank 3. Corresponding to the reduction of the gear mechanism 5, the drive-proximal rotating movement D causes an output-proximal rotating movement D' on the tool-proximal shank 3. The tool system 1 thus creates the possibility of using a rotating movement D that can be acquired from a tool carrier for a rotary adjustment of the tool-proximal shank 3 and a tool holder 4 connected thereto.

In the tool system 1 shown, a tool holder 4 is assembled on the tool-proximal shank 3. Alternatively, the tool-proximal shank 3 could be configured directly as a tool holder 4. In other words, the tool holder 4 can be configured so as to be integral to the tool-proximal shank 3, or be designed so as to be detachable.

In the present exemplary embodiment, the tool holder 4 is disposed eccentrically on the tool-proximal shank 3. In other words, a longitudinal axis L2 of the tool-proximal shank 3 and a longitudinal axis L3 of the tool holder 4 do not coincide, but the longitudinal axes L2 and L3 are preferably parallel.

In the embodiment shown here, a rotating movement D of the tool-proximal shank 3, more specifically of the means 21 located therein, causes a pivoting movement of the tool holder 4 along a circular path about the longitudinal axis L2 of the tool-proximal shank 3.

In an alternative, coaxial disposal of the tool-proximal shank 3 and the tool holder 4, the rotating movement D causes the tool holder 4 to rotate about the longitudinal axis L3 thereof.

A rotating movement D, which by way of the means 21 can be acquired from a driven tool carrier and by way of the gear mechanism 5 be transmitted to the tool-proximal shank 3, can be used in such a manner to adjust the tool holder 4 and consequently the insert seat 6 configured thereon.

In this way, the tool system 1 allows the use of a drive of a driven tool receptacle for an adjustment, in particular a fine adjustment, of the insert seat 6, or a cutting insert 7 that can be fastened to the insert seat 6, respectively.

The longitudinal axis L1 of the machine-proximal shank 2, said longitudinal axis L1 coinciding with a longitudinal axis of the means 21 for transmitting a rotating movement, is parallel to the longitudinal axis L2 of the tool-proximal shank 3 in the exemplary embodiment.

In the present exemplary embodiment, the longitudinal axes L1 and L2 are disposed in parallel.

An angular disposal of the machine-proximal shank 2 and the tool-proximal shank 3 is also conceivable.

An insert seat 6 for accommodating an interchangeable cutting insert 7 is configured on an end face of the tool holder 4 that faces away from the gear mechanism 5 and extends transversely to the longitudinal axis L3 of the tool holder 4.

In the arrangement shown, a cutting insert 7 is assembled in a rotationally fixed manner on the insert seat 6. The cutting insert 7 is tightened and secured on the insert seat 6 by means of a screw.

The insert seat 6 is preferably disposed so as to be substantially orthogonal to the longitudinal axis L3 of the tool holder 4.

In the arrangement shown here, an interchangeable cutting insert 7 having an upper side 10 configured as a cutting face and a lower side 11 configured as a bearing face is disposed on the insert seat 6 in such a manner that the upper side 10 of the cutting insert 7 extends substantially perpendicularly to the longitudinal axis L3 of the tool holder 4. The statement "substantially" includes angular deviations of several degrees, for example 10°. An orthogonal disposal of the upper side 10 in relation to the longitudinal axis L3 of the tool holder 4 is preferred, i.e. a disposal at 90°. In other words, a plane normal of the upper side 10 preferably runs parallel to the longitudinal axis L3 of the tool holder 4.

In a design embodiment of the cutting insert 7 having a substantially plane-parallel disposal of the upper side 10 and lower side 11, the preferably orthogonal disposal of the upper side 10 in relation to the longitudinal axis L3 of the tool holder 4 means that the insert seat 6 also runs orthogonally to the longitudinal axis L3 of the tool holder 4.

In the event that a cutting insert of which the upper side 10 and lower side 11 do not run plane-parallel, is to be used, the insert seat 6 must be adapted accordingly to fulfill the preferred orthogonal disposal of the upper side 10 in relation to the longitudinal axis L3 of the tool holder 4.

In terms of the method for machining a workpiece W, FIG. 1 shows the tool system 1 in a machining situation, having a workpiece W. Shown is machining by turning. The workpiece W by way of a rotating direction R rotates about a workpiece longitudinal axis WL.

The cutting insert 7 is preferably aligned in such a manner that the upper side 10 thereof, which is configured as a rake face, runs normal to the longitudinal axis L3 of the tool holder 4.

The tool system 1 is actuated relative to the workpiece W in such a way that a cutting edge 9 of the cutting insert 7 is at least in portions engaged with the workpiece W and chips can run off the upper side 10 of the cutting insert 7 configured as a rake face.

The arrangement has the effect that machining forces that arise act on the tool holder 4 substantially axially in the direction of the longitudinal axis L3 of the tool holder 4, while in conventional arrangements the machining forces during turning exert a bending moment on a tool body carrying the cutting insert.

Using the coordinate system shown in FIG. 1, the preferred spatial conditions can be described as follows:
the workpiece longitudinal axis WL runs parallel to the z-axis; the upper side 10 of the cutting insert 7 lies in a plane parallel to the yz-plane; the longitudinal axis L3 of the tool holder 4 is parallel to the x-axis. Feeding takes place in a feed direction V parallel to the z-axis, here in the negative z-direction.

In the machining situation shown, a cutting edge 91 and an active cutting corner 81 during longitudinal turning are in engagement with the workpiece W, while creating a shoulder on the workpiece W.

Figure 2:
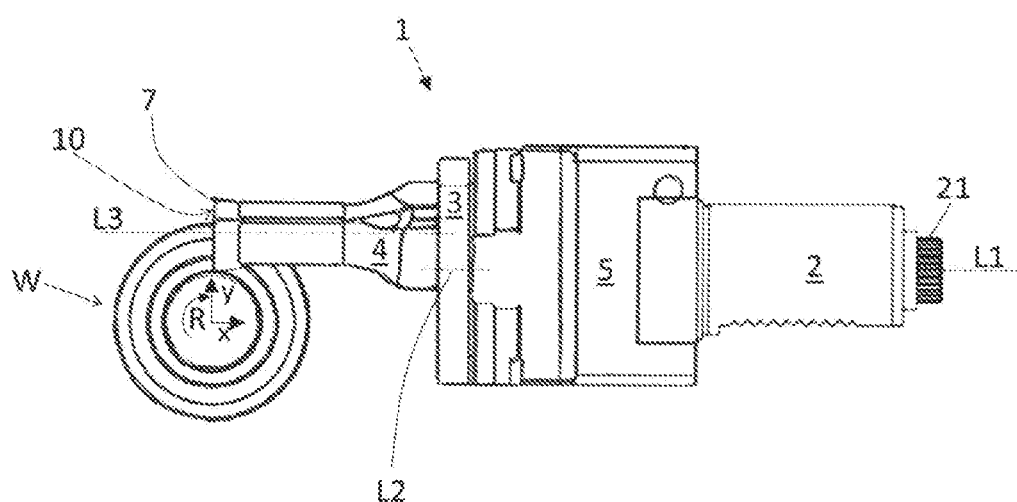
FIG. 2 shows the embodiment in a lateral view.

FIG. 2 shows the arrangement as per FIG. 1 in a lateral view.

In this exemplary embodiment, the longitudinal axis L3 of the tool holder 4 is aligned in such a way that said longitudinal axis L3 lies in a plane xy that runs perpendicularly to the workpiece longitudinal axis WL. Specifically, the longitudinal axis L3 of the tool holder 4 runs parallel to the x-axis and normal to the workpiece longitudinal axis WL.

It is preferably provided that the upper side 10 of the cutting insert 7, which is configured as a rake face, lies in a plane which contains the workpiece longitudinal axis WL.

The cutting insert 7 is preferably aligned in such a manner that the upper side 10 thereof, which is configured as a rake face, runs normal to the longitudinal axis L3 of the tool holder 4. The upper side 10 furthermore preferably lies in a plane yz which contains the workpiece longitudinal axis WL.

The longitudinal axis L3 of the tool holder 4 is preferably aligned in a plane xy perpendicular to the workpiece longitudinal axis WL.

The longitudinal axis L3 of the tool holder 4 particularly preferably runs parallel to the x-axis, and the workpiece longitudinal axis WL runs parallel to the z-axis.

Aspects of the method according to the invention for machining a workpiece are to be discussed in more detail by means of FIG. 2.

The process for machining a workpiece initially includes the following steps:
  rotating the workpiece W about a workpiece axis WL,
  machining a surface of the workpiece W using the cutting insert 7 in such a manner that the upper side 10 of the cutting insert 7 is substantially perpendicular to the longitudinal axis L3 of the tool holder 4.

The upper side 10 of the cutting insert 7 preferably lies in a plane which contains the workpiece longitudinal axis WL. This depicts the preferred case in which the upper side 10 of the cutting insert 7, configured as a rake face, is oriented to the workpiece W such that a tangential direction of the rotating movement R of the workpiece W in the plane of engagement is normal to the upper side 10.

In terms of the method according to the invention it is furthermore provided that an orientation of the cutting insert 7 is changed in that a rotating movement D from the machine-proximal shank 2 is transmitted by way of a reduction to the tool holder 4 carrying the cutting insert 7. To this end—as already described above for the tool system 1—a rotating movement that can be acquired from a driven tool carrier is transmitted to the tool holder 4 via the means 21 for transmitting a rotating movement.

This change in the orientation of the cutting insert 7 can either take place while the cutting insert 7 is disengaged from the workpiece W, or is in the cutting mode, i.e. in an operating position.

According to the latter variant, it is provided in particular that the angle of attack of a cutting edge of the cutting insert 7 that is in engagement is changed. To this end, a drive of the driven tool carrier is activated until the desired change in the alignment of the cutting insert 7 has been completed.

A change in the orientation of the cutting insert 7 when disengaged from the workpiece W takes place in such a manner that the tool system 1 is initially moved to a position outside an operating position. To this end, the tool system 1 is preferably moved in the xy plane or a plane parallel thereto until the cutting insert 7 is in a position in which no collision with the workpiece W can arise.

In this secure position, a drive of the driven tool carrier is now activated until the desired change in the alignment of the cutting insert 7 has been completed.

The change in the alignment of the cutting insert 7 can be that an angle of attack of a cutting edge 9 that is provided for the subsequent machining step is adjusted. Alternatively, the change in the alignment of the cutting insert 7 can lie in positioning another cutting edge 9 for the subsequent machining step.

After changing the alignment of the cutting insert 7, the tool system 1 is displaced back to an operating position, i.e. the cutting insert 7 is brought back to engage with the workpiece W.

Figure 3:
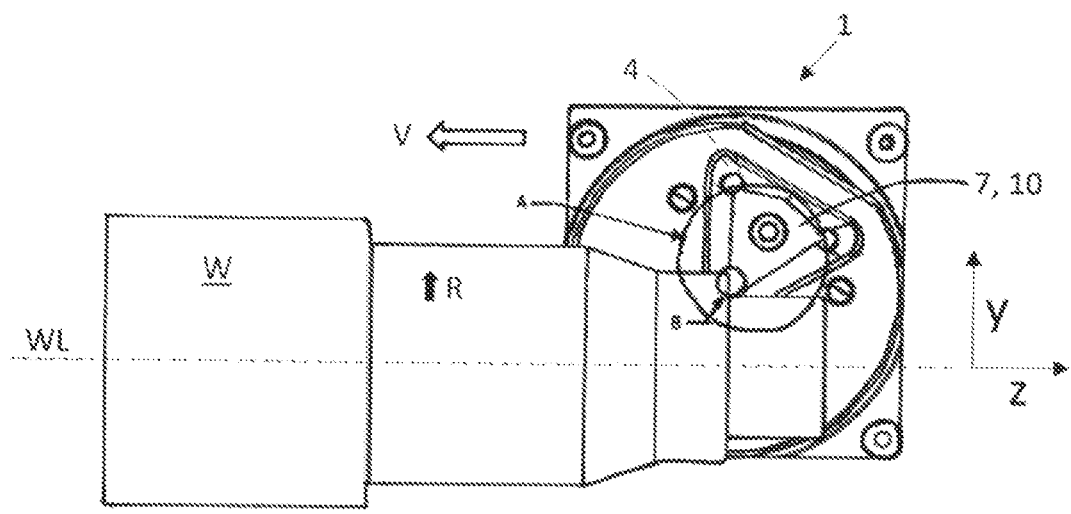
FIG. 3 shows the embodiment in a front view.

FIG. 3 shows the tool system 1 of the previous drawings in a front view along the x-axis, normal to the end face of the tool holder 4 and the upper side 10 of the cutting insert 7, the latter being aligned normal to the longitudinal axis L3 of the tool holder 4.

Figures 4A, 4B:
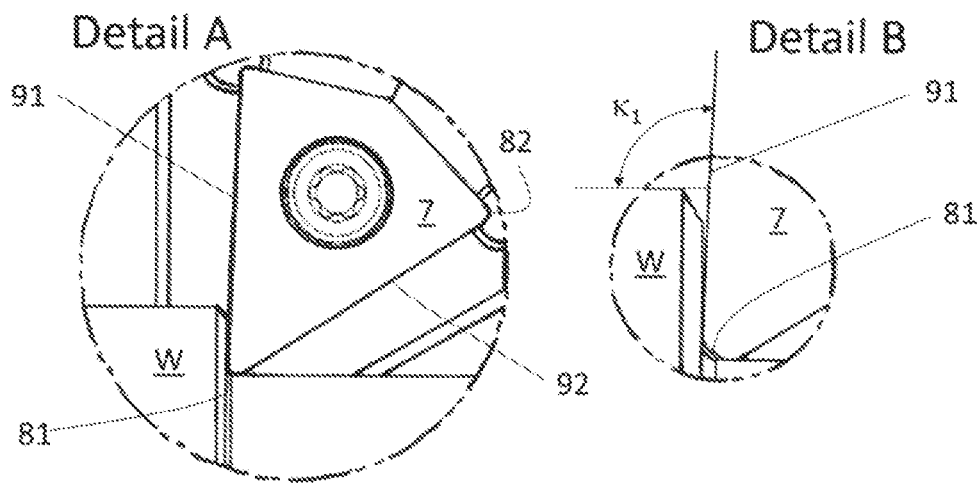
FIGS. 4a, 4b show details from FIG. 3.

FIG. 4a shows the enlarged detail A from FIG. 3; FIG. 4b shows the enlarged detail B from FIG. 3.

The cutting insert 7 is engaged with the workpiece W by way of the active cutting edge 91 and the active cutting corner 81. The cutting edge 91 is aligned in relation to the workpiece longitudinal axis WL at the lead angle $\kappa_1$.

As is apparent from FIG. 4b, the angle of attack $k_1$ of more than 90° in the shown alignment of the cutting insert 7 is selected so as to produce a shoulder on the workpiece W. In the machining by turning shown, the tool system 1 can be moved along a feed direction V parallel to the workpiece longitudinal axis WL.

Longitudinal turning while creating a shoulder on the workpiece W is shown here. In a variant, the feed can take place in the opposite direction.

The tool system 1 according to the invention allows a change in the alignment of the cutting insert 7 in that a rotating movement, which can be acquired from a driven tool carrier, is transmitted to the tool holder 4.

For longitudinal turning, for example, the angle of attack $\kappa$ can be reduced. As already stated, the change in the alignment of the cutting insert 7 can take place in the cutting mode or in a position outside an operating position.

Figure 5:
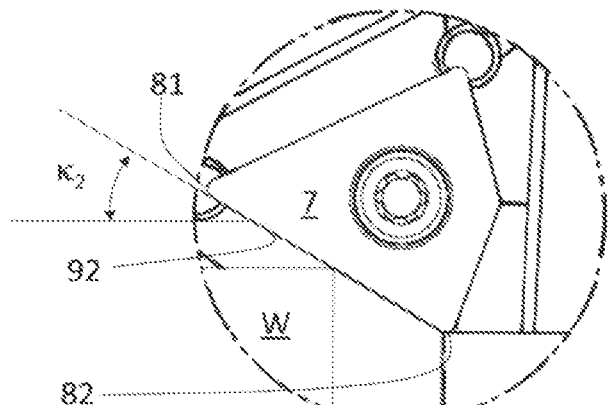
FIG. 5 shows an arrangement having a changed angle of attack.

Thus, FIG. 5 shows an illustration of the tool system 1 in the same view as in FIG. 4a, having a different alignment of the cutting insert 7 in comparison to FIGS. 3 and 4. The cutting insert 7 was rotated clockwise by approximately 60° compared to the previously shown orientation. The cutting corner 82 now acts as the active cutting corner, and the cutting edge 92 acts as the active cutting edge.

The angle of attack $\kappa_2$ of the cutting edge 92 in the shown alignment of the cutting insert 7 is smaller here than in FIGS. 3 and 4, as is typical of longitudinal turning at high feed rates and low cutting depths.

The change in the alignment of the cutting edge 91 shown here can be effected using the tool system 1 according to the invention in that a rotating movement from the means 21 for transmitting the rotating movement is transmitted by way of reduction by the gear mechanism 5 to the tool holder 4 carrying the cutting insert 7.

Figure 6:
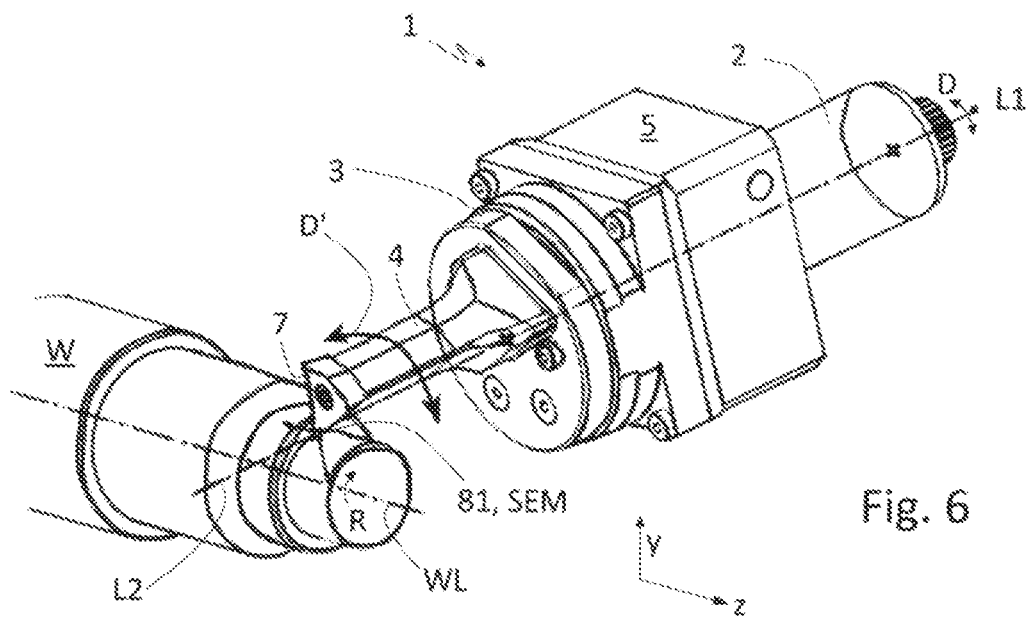
FIG. 6 shows a further embodiment of the tool system.

FIG. 6 shows a tool system 1 in a further embodiment.

In this embodiment it is specified that the longitudinal axis L2 of the tool-proximal shank 3 runs through a cutting corner radius center SEM of the active cutting corner 81 of the cutting insert 7. As already explained above, this configuration has the particular advantage that, when the tool-proximal shank 3 rotates, the cutting corner 81 cannot be changed in terms of the feed thereof relative to the workpiece W. There is thus no need to compensate for the position of the cutting corner 81 by means of a translatory movement of the tool system 1 coordinated with the rotation of the cutting insert 7 in or parallel to the yz plane.

Furthermore, in this exemplary embodiment, the longitudinal axis L2 of the tool-proximal shank 3 coincides with the longitudinal axis L1 of the machine-proximal shank 2. For the effect of the rotational invariance of the cutting corner 81 in relation to a rotation about the longitudinal axis L2 of the tool-proximal shank 3, said longitudinal axis L2 running through the cutting corner radius center SEM of the cutting corner 81, it is of course not necessary for the longitudinal axis L1 of the machine-proximal shank 2 to coincide with the longitudinal axis L2 of the tool-proximal shank 3.

Figures 7A, 7B:
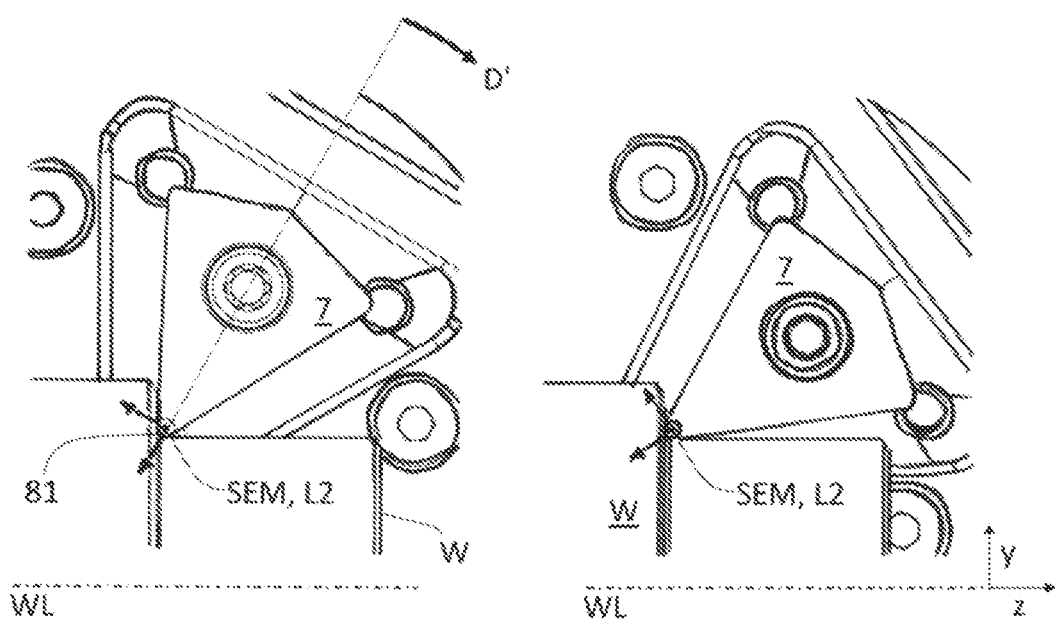
FIGS. 7a, 7b show details of FIG. 6.

FIGS. 7a and 7b show a front-end view of the cutting insert 7 for a configuration according to FIG. 6, having two different alignments of the cutting insert 7 in terms of an angle of attack in relation to the workpiece W.

The cutting corner 81 of the cutting insert 7 is in engagement with the workpiece W. The longitudinal axis L2 of the tool-proximal shank 3, and thus the axis of rotation of the latter, runs through the cutting corner radius center SEM of the active cutting corner 81. In other words, the center of a rotating movement of the tool-proximal shank 3 lies in the center SEM of the cutting corner radius.

If the tool-proximal shank 3 is now rotated by transmitting the rotating movement D (as illustrated by an arrow in FIG. 7a), the cutting insert 7 performs a rolling movement along the cutting corner 81, as a result of which a radial position (i.e. a position in the y-direction) of the cutting corner 81 relative to the workpiece longitudinal axis WL remains unchanged.

These conditions become clear when viewing FIGS. 7a and 7b in combination. Compared to the orientation of the cutting insert 7 in FIG. 7a, the cutting insert 7 in FIG. 7b is rotated clockwise by approximately 24°. The position of the cutting corner 81 relative to the workpiece longitudinal axis WL remains unaffected by the rotation.

As a result of the preferred design embodiment of the tool system 1, in which the longitudinal axis L2 of the tool-proximal shank 3 runs through the cutting corner radius center SEM of the active cutting corner 81 of the cutting insert 7, changes in the alignment of the cutting insert 7 during machining, i.e. in the cutting mode, are made possible in a particularly advantageous manner.

Figure 8:
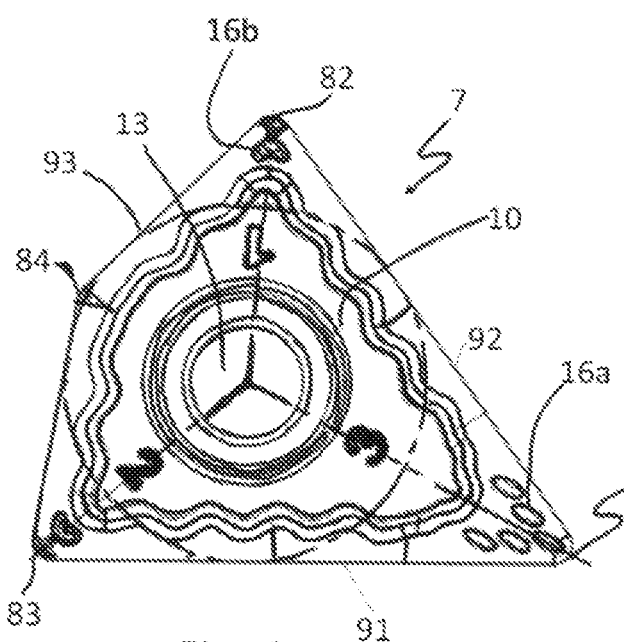
FIGS. 8-10 show an example of a cutting insert.
Figure 9:
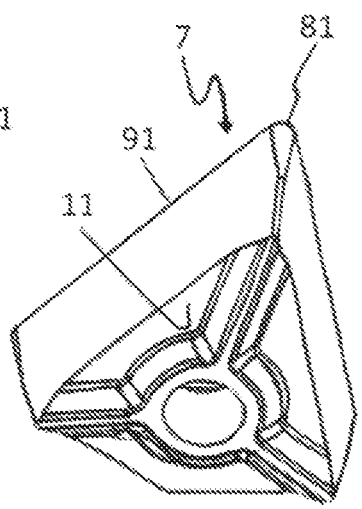
Figure 10:
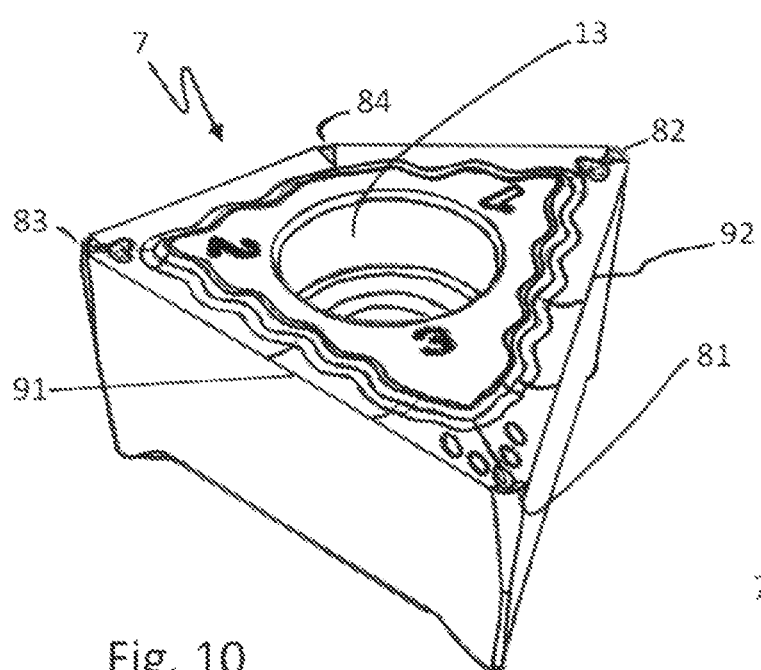

FIGS. 8 to 10 show various illustrations of an exemplary cutting insert 7 which is particularly suitable for use with the tool system 1 according to the invention and for the machining method according to the invention. The cutting insert 7 has a basic shape of an isosceles triangle with an additional corner. The cutting insert 7 is configured for use on one side.

FIG. 8 shows a plan view of the cutting insert 7. The upper side 10 of the cutting insert 7 is configured as a rake face; chip geometries 16a, 16b are configured. The cutting insert 7 has three corners that can be utilized as cutting corners: Cutting corners 81, 82, 83. A further corner 84 is also configured.

Cutting edges 91, 92 extend between the cutting corners 81, 82, 83.

In this example, the cutting corners 82, 83 differ from the cutting corner 81, inter alia, by way of the point angle of the former, i.e. the angle which the cutting edges adjacent the cutting corner enclose with one another. The further corner 84 causes the point angle of the cutting corners 81, 82 to be increased in comparison to a linear profile of a cutting edge 93 between the cutting corners 81, 82.

Furthermore, in this specific example, different chip geometries 16b on the cutting corners 82, 83 are formed as chip geometries 16a on the cutting corner 81. Moreover, the cutting corners 82, 83 differ from the cutting corner 81 in terms of the corner radius of the former.

The cutting insert 7 has a through hole 13 for receiving a clamping screw for fastening in the insert seat.

FIG. 9 shows the cutting insert 7 in a view of the lower side 11. The lower side 11 is configured as a bearing face to be received so as to be secured against rotation in an insert seat. The upper side 10 and the lower side 11 are mutually parallel.

FIG. 10 shows the cutting insert 7 of this example in a perspective view.

Using a cutting insert 7 according to this example, various machining operations of machining by turning can be advantageously carried out. The cutting insert 7 discussed here is particularly advantageous when machining operations require different characteristics of cutting corners.

For example, it is advantageous to use a cutting corner with a different, preferably smaller, point angle for finishing work than for rougher machining. In particular, in the case of the cutting corner provided for finishing machining, a special chip geometry and a different, in particular smaller, corner radius are provided. In the case of the cutting insert 7 shown in FIGS. 8-10, the cutting corner 81 is particularly suitable for finishing work. The cutting corner 81 has a smaller point angle than the cutting corners 82, 83. In addition, the cutting corner 81 also has a smaller corner radius, i.e. thus is more pointed, than the cutting corners 82, 83. Furthermore, a chip geometry 16a assigned to the cutting corner 81 is specially configured for finishing work: it is narrower in shape than, for example, the chip geometry 16b assigned to the cutting corners 82, 83. Adequate subtractive forming is thus achieved even with minor cutting depths in finishing work.

Figure 11:
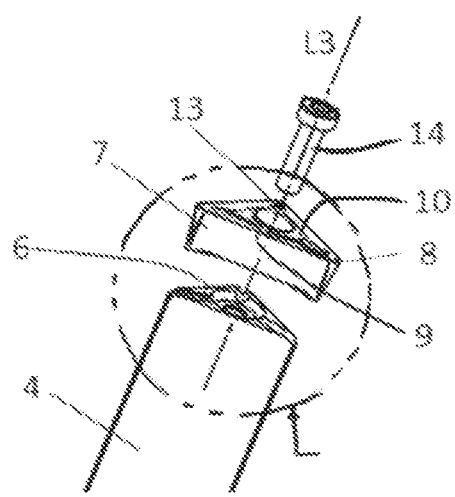
FIG. 11 shows an arrangement of the cutting insert and the tool holder.

FIG. 11 shows a detail of the tool system 1. The tool holder 4 of the tool system 1 is shown having an insert seat 6 which for receiving a replaceable cutting insert 7 is configured on the tool holder, said insert seat 6 being configured on an end face of the tool holder 4 that extends transversely to a longitudinal axis L3 of the tool holder 4.

The cutting insert 7 is fixed in the insert seat by means of a clamping screw 14. A clamping force exerted by the clamping screw 14 acts predominantly along the longitudinal axis L3 of the tool holder. In the assembled state, the upper side 10 of the cutting insert 7 runs transversely to the longitudinal axis L3 of the tool holder 4. In particular, and as shown here, the upper side 10 is perpendicular to the longitudinal axis L3.

The arrangement shown, according to which the insert seat 6 and the inserted cutting insert 7 are disposed such that the upper side 10 of the cutting insert 7 runs perpendicular to the longitudinal axis L3 of the tool holder 4, is particularly advantageous for the tool system 1 according to the invention.

The cutting insert 7 and the tool holder 4 are sized and disposed such that at least one cutting corner 8 and cutting edges 9 adjacent thereto on both sides project at least in portions beyond an external circumference of the end face of the tool holder 4.

Furthermore preferably and as shown in this example, the entire external circumference of the cutting insert 7 formed by cutting edges 9 projects beyond the external circumference of the tool holder 4. In other words, the cutting insert 7 protrudes beyond the insert seat 6 along the entire circumference of the latter.

In principle, the cutting insert 7 can thus be used along the entire circumference thereof. In this manner, the cutting insert 7 can be left in one and the same assembly situation on the insert seat 6 if, by actuating the tool system 1, other cutting corners 8 and/or cutting edges 9 are to be used for a subsequent machining step.

Figure 12:
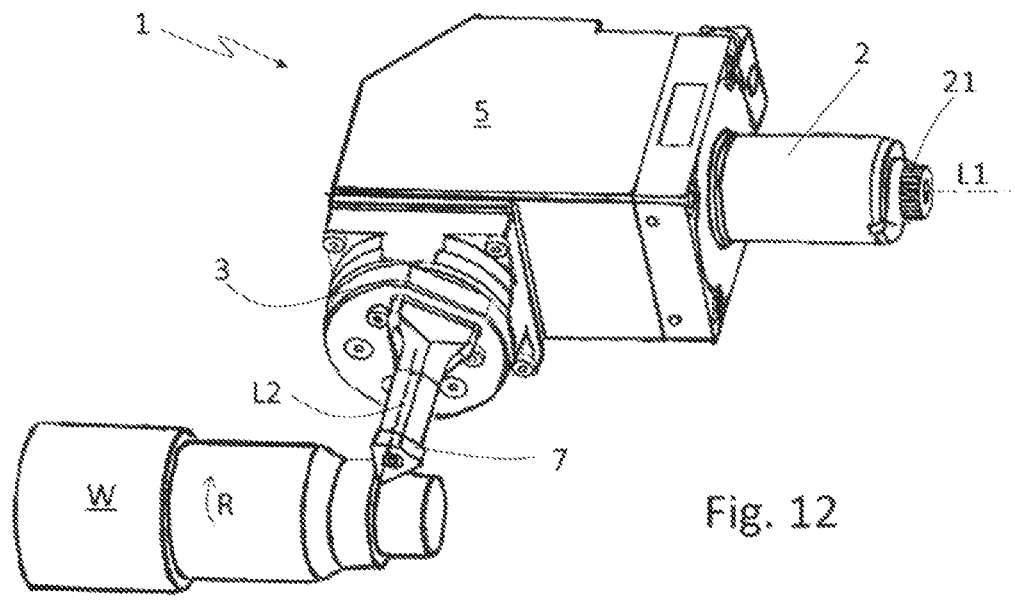
FIG. 12 shows a further embodiment of the tool system.

FIG. 12 shows a tool system 1 in an embodiment in which the longitudinal axis L1 of the machine-proximal shank 2 runs so as to be substantially perpendicular to the longitudinal axis L2 of the tool-proximal shank 3. This design embodiment of the tool system 1 is particularly advantageous for use with an end-side, i.e. axial, arrangement on a tool carrier, for example on a tool turret with end-side tool receptacles, a so-called disk turret.

Figure 13:
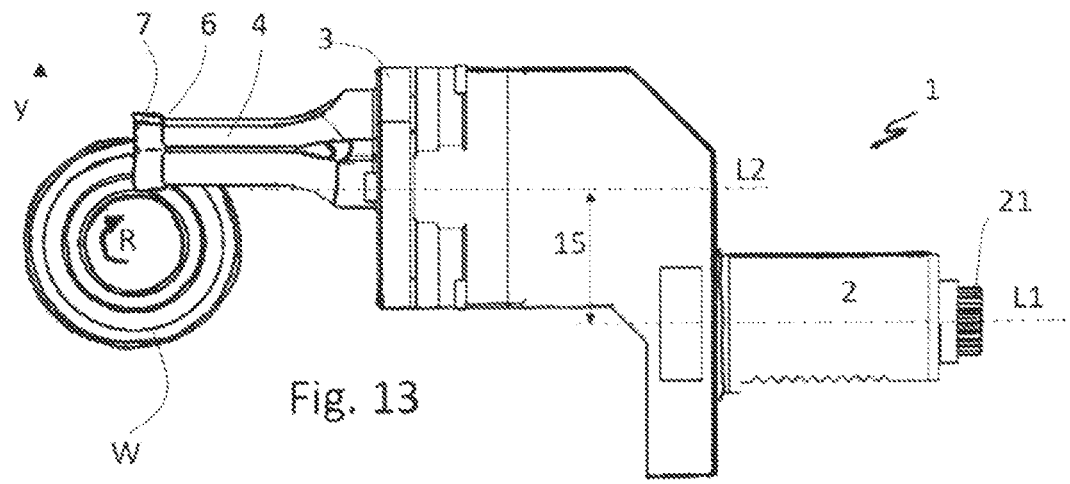
FIG. 13 shows a further embodiment of the tool system.

FIG. 13 shows a tool system 1 in an alternative embodiment, in which the longitudinal axis L1 of the machine-proximal shank 2 runs parallel to and at a lateral offset 15 from the longitudinal axis L2 of the tool-proximal shank 3. This design embodiment of the tool system 1 is particularly advantageous for use with a circumferential, i.e. radial, arrangement on a tool carrier, for example on a tool turret having radially disposed tool receptacles, a so-called star turret. Such a cranked configuration can be advantageous in cases in which a displacement path of the tool receptacle in the y-direction is restricted. In this instance, it is possible to first move the tool system 1 to a detent in the negative y-direction and to then have twice the travel distance available in the positive y-direction. This allows greater freedom with regard to the maximum permissible diameters of workpieces.

In the examples shown, a longitudinal axis of the means 21 for transmitting a rotating movement that can be acquired from the driven tool receptacle coincides with the longitudinal axis L1 of the machine-proximal shank 2.

Figure 14:
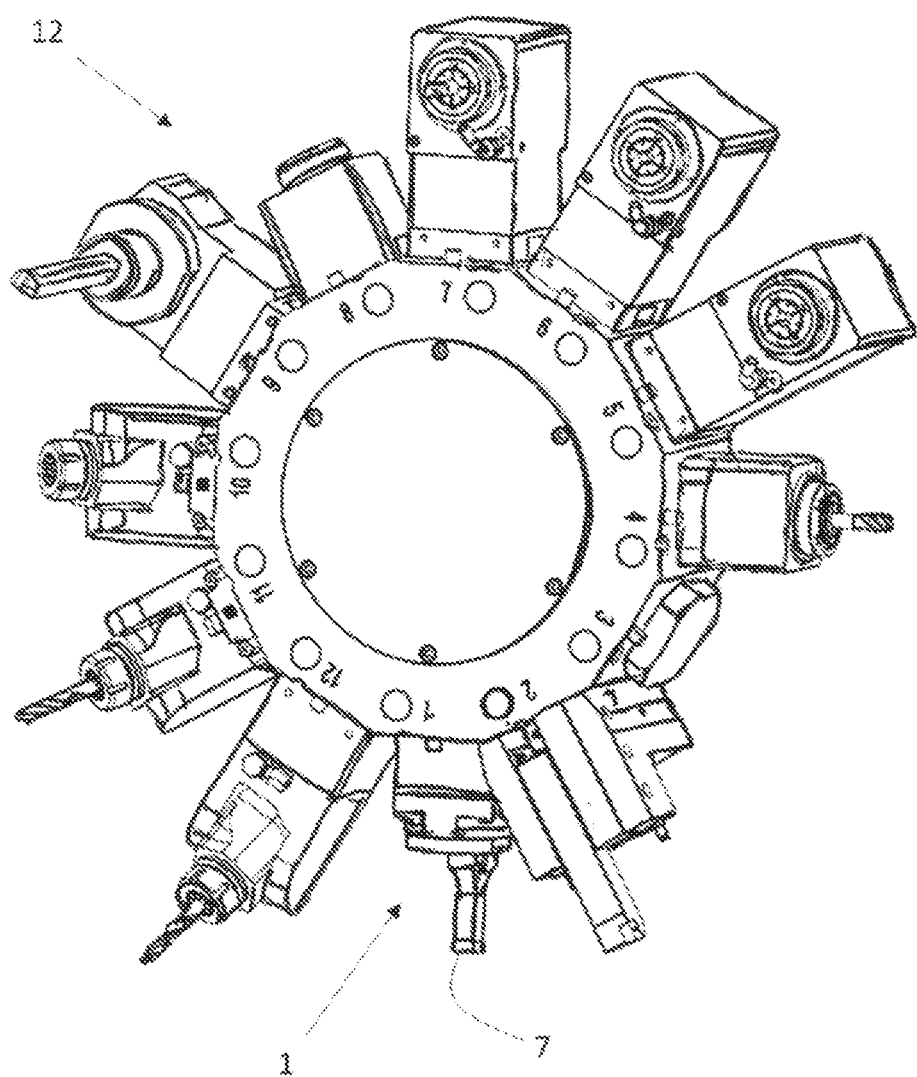
FIG. 14 shows an assembly of the tool system and the tool carrier.

FIG. 14 shows a tool carrier 12 having a plurality of tool receptacles.

According to the explanations above, a distinction is made between radial and axial arrangements on a tool carrier.

The tool carrier is configured here as a tool turret 12 having radially disposed tool places. This is also referred to as a star turret.

By turning the turret disk, the tool that is currently required can be pivoted to a use position. The tool system 1 according to the invention is disposed circumferentially, i.e. radially, on the tool turret 12.

The tool system 1 is preferably designed according to the exemplary embodiment described in FIG. 13.

The tool turret 12 is embodied as a driven tool receptacle, the drive of which can be used by the tool system 1 to adjust the alignment of the cutting insert 7 fastened thereto, as described above.

If a tool turret is configured for receiving tools on the end face, i.e. axially, it is referred to as a disk turret (not shown here). In this case, a design embodiment of the tool system 1 according to the exemplary embodiment described by means of FIG. 12 is particularly advantageous.

Figure 15A:
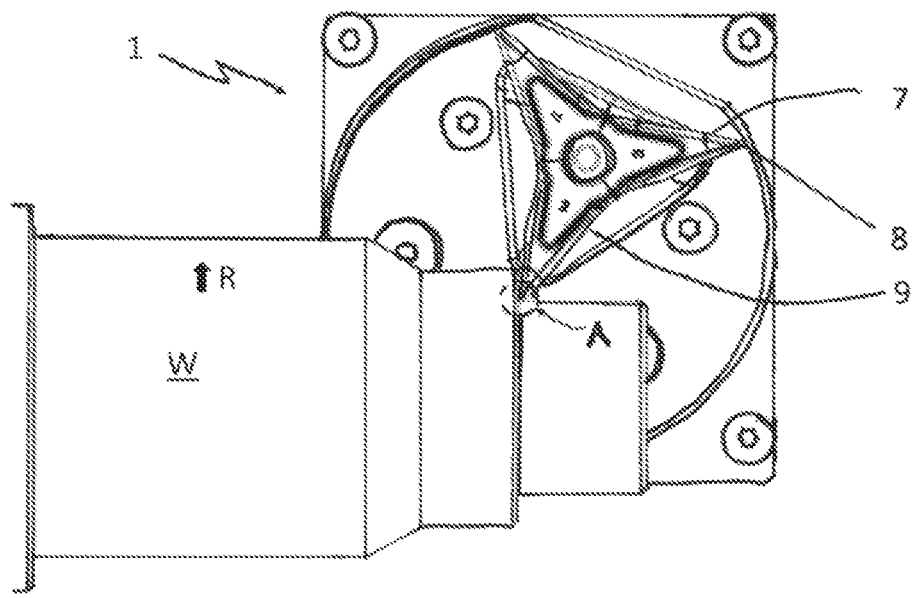
FIGS. 15a, 15b shows the tool system having a cutting insert according to a further alternative.
Figure 15B:
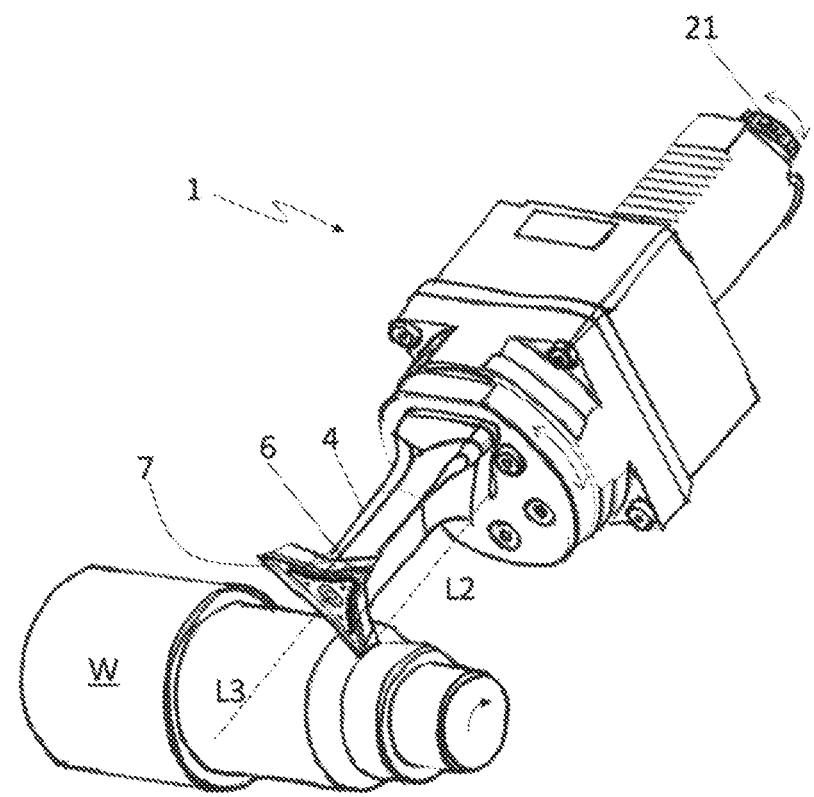

FIGS. 15a and 15b show an embodiment of the tool system 1 having a cutting insert 7 in a further alternative.

The cutting insert 7 has a basic shape of an equilateral triangle.

A basic shape of an equilateral triangle allows, for example, indexing of the cutting insert 7 by a rotation of 120°, with the geometric relationships remaining unchanged herein by virtue of the three-fold symmetry. As a result of the tool system 1 according to the invention, it is particularly easy to change from one cutting corner 8 to another, for example unused cutting corner 8, without the cutting insert 7 having to be released from the insert seat 6 to this end.

It can likewise be seen that the cutting corners 8 and cutting edges 9 protrude beyond the insert seat 6, i.e. in the radial direction with respect to the longitudinal axis L3 of the tool holder 4 protrude beyond an external circumference of the end face of the tool holder 4.

It could also be provided that not all the cutting corners 8 protrude beyond the insert seat 6, but—in the case of a triangular insert—only one or two cutting corners 8. However, it is advantageous for all embodiments if all of the cutting corners 8 and cutting edges 9 protrude beyond the insert seat 6, because then all cutting corners 8 and cutting edges 9 can be utilized for machining by rotating the tool holder 4, without the cutting insert 7 being released from the insert seat 6 and having to be rotated (indexed) onward.

FIGS. 16a to 16d show the cutting insert 7 from FIGS. 15a and 15b in detail.

Figure 16A:
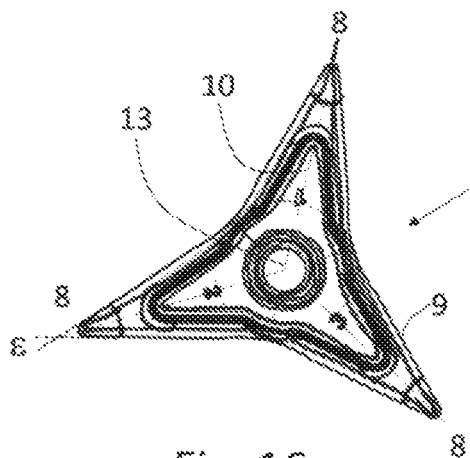
FIGS. 16a to 16d show the cutting insert 7 of FIGS. 15a and 15b in detail.
Figure 16B:
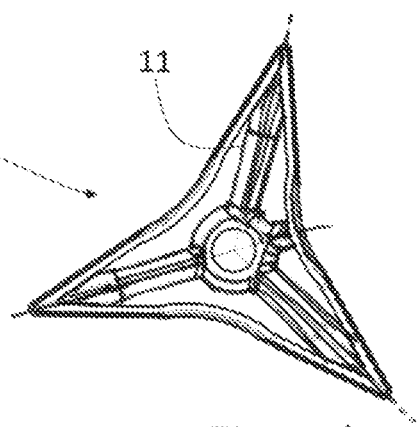
Figure 16C:
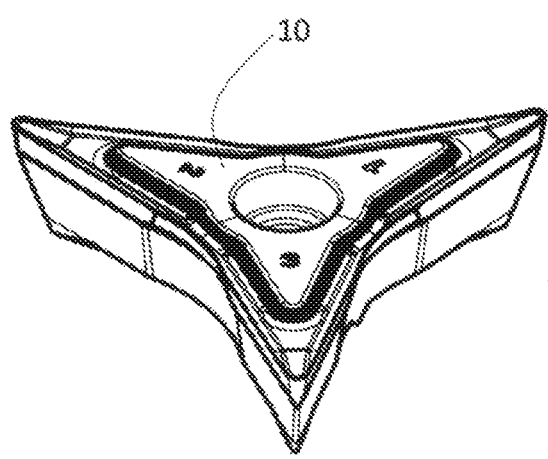
Figure 16D:
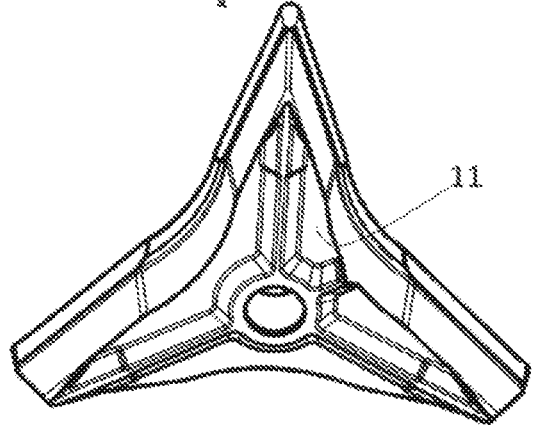

FIG. 16a shows a plan view of the upper side 10; FIG. 16b shows a view of the lower side 11 from below; FIG. 16c shows a perspective view toward the upper side 10; FIG. 16d shows a perspective view toward the lower side 11.

The upper side 10 is configured as a rake face; the lower side 11 is configured as a bearing face for fastening to the insert seat 6. The upper side 10 and the lower side 11 are mutually parallel. The cutting insert 7 tapers from the upper side 10 to the lower side 11, resulting in a clearly positive geometry of the cutting edges 9 and cutting corners 8.

The cutting insert 7 has a three-fold symmetry. The cutting insert 7, by rotating the latter by 120°, can be rotated to a next cutting corner 8.

In the cutting insert 7 shown here, the cutting edges are configured so as to be concave in terms of a plan view of an upper side 10. This means that the cutting edges 9 are drawn radially inward, toward the center of the cutting insert 7. This enables a particularly small point angle c to be created at a cutting corner 8, as is favorable for copy turning.

This design embodiment is very advantageous for copying operations or for finishing and working in narrow grooves.

In contrast to the cutting insert 7 shown here, corner radii of different sizes can also be provided at different cutting corners 8.

LIST OF REFERENCE SIGNS USED

1 Tool system
2 Machine-proximal shank
21 Means for transmitting the rotating movement
3 Tool-proximal shank
4 Tool holder
5 Gear mechanism
6 Insert seat
7 Cutting insert
8, 81, 82 . . . Cutting corner(s)
9, 91, 92 . . . Cutting edge(s)
10 Upper side of the cutting insert
11 Lower side of the cutting insert
12 Tool carriers
13 Through hole
14 Clamp screw
15 Offset
16 Chip geometry
L1 Longitudinal axis of the machine-proximal shank
L2 Longitudinal axis of the tool-proximal shank, or of the means for transmitting the rotating movement, respectively
L3 Longitudinal axis of the tool holder
SEM Cutting corner radius center
V Feed
W Workpiece
WL Workpiece longitudinal axis

The invention claimed is:

1. A tool system comprising:
a machine-proximal shank configured to be insertable into a driven tool receptacle, said machine-proximal shank having a longitudinal axis and said machine-proximal shank containing a device for transmitting a rotating movement to be acquired from the driven tool receptacle;
a tool-proximal shank having a longitudinal axis, said tool-proximal shank configured as a tool holder or configured have a tool holder releasably connected to said tool-proximal shank, said tool holder having a longitudinal axis and an end face extending transversely to said longitudinal axis;

a gear mechanism disposed between said machine-proximal shank and said tool-proximal shank, said gear mechanism configured to transmit a rotating movement transmitted by said device to said tool-proximal shank with a reduction;

an interchangeable cutting insert; and at least one insert seat configured on said tool holder for receiving said interchangeable cutting insert, said at least one insert seat configured on said end face of said tool holder;

said at least one insert seat having an end face extending transversely to said longitudinal axis of said tool holder;

said tool-proximal shank and said longitudinal axis of said tool holder coinciding or at least running parallel to one another and said tool holder being rotatable or pivotable about said longitudinal axis of said tool-proximal shank;

said interchangeable cutting insert including at least one cutting corner having an upper side configured as a rake face and a lower side configured as a bearing face, said interchangeable cutting insert being disposed on said at least one insert seat with said upper side of said interchangeable cutting insert extending transversely to said longitudinal axis of said tool holder.

2. The tool system according to claim 1, wherein said reduction provided by said gear mechanism of said rotating movement transmitted by said device to said tool-proximal shank, is between 50:1 and 1000:1.

3. The tool system according to claim 1, wherein said reduction provided by said gear mechanism of said rotating movement transmitted by said device to said tool-proximal shank, is between 75:1 and 125:1.

4. The tool system according to claim 1, wherein said reduction provided by said gear mechanism of said rotating movement transmitted by said device to said tool-proximal shank, is approximately 100:1.

5. The tool system according to claim 1, wherein said gear mechanism is a strain wave gear.

6. The tool system according to claim 1, wherein said at least one cutting corner has a cutting corner radius center, and said longitudinal axis of said tool-proximal shank runs through said cutting corner radius center.

7. The tool system according to claim 1, wherein said interchangeable cutting insert has at least two mutually dissimilar cutting edges.

8. A method for machining a workpiece, the method comprising:

providing a tool system including:

a machine-proximal shank configured to be insertable into a driven tool receptacle, the machine-proximal shank containing a device for transmitting a rotating movement to be acquired from the driven tool receptacle;

a tool-proximal shank configured as a tool holder or configured to have a tool holder releasably connected to the tool-proximal shank;

a gear mechanism disposed between the machine-proximal shank and the tool-proximal shank, the gear mechanism configured to transmit a rotating movement transmitted by the device to the tool-proximal shank with a reduction; and at least one insert seat configured on the tool holder, the at least one insert seat receiving an interchangeable cutting insert in the at least one insert seat, the insert seat configured on an end face of the tool holder extending transversely to a longitudinal axis of the tool holder;

the at least one insert seat having an end face extending transversely to the longitudinal axis of the tool holder;

the tool-proximal shank and the longitudinal axis of the tool holder coinciding or at least running parallel to one another and the tool holder being rotatable or pivotable about a longitudinal axis of the tool-proximal shank;

the interchangeable cutting insert including at least one cutting corner having an upper side configured as a rake face and a lower side configured as a bearing face;

rotating the workpiece about a workpiece axis;

machining a surface of the workpiece using the cutting insert with the upper side of the cutting insert configured as the rake face substantially perpendicular to the longitudinal axis of the tool holder; and changing an alignment of the cutting insert and transmitting a rotating movement from the device for transmitting the rotating movement to the tool holder carrying the cutting insert with a reduction by the gear mechanism.

9. The method according to claim 8, which further comprises carrying out the changing of the alignment of the cutting insert while the cutting insert is disengaged from the workpiece.

10. The method according to claim 8, which further comprises carrying out the changing of the alignment of the cutting insert while the cutting insert is engaged with the workpiece.

11. The method according to claim 8, which further comprises carrying out the changing of the alignment of the cutting insert by rotating the tool holder and changing an angle of attack of an active chip-removing cutting edge of the cutting insert.

12. The method according to claim 8, which further comprises carrying out a translatory movement of the tool holder coordinated with the rotation of the tool holder parallel to the workpiece axis.

13. The method according to claim 8, which further comprises providing the tool system according to claim 1 as the tool system.

14. The method according to claim 8, which further comprises using the tool system to change an alignment of a cutting edge of the cutting insert when machining the workpiece.

* * * * *